United States Patent
Chu et al.

(10) Patent No.: US 7,278,015 B2
(45) Date of Patent: Oct. 2, 2007

(54) METHODS AND DEVICES FOR DRAM INITIALIZATION

(75) Inventors: Hsiu Ming Chu, Xindian (TW); Wei Hsiang Li, Xindian (TW)

(73) Assignee: VIA Technologies, Inc., Taipei (TW)

( * ) Notice: Subject to any disclaimer, the term of this patent is extended or adjusted under 35 U.S.C. 154(b) by 359 days.

(21) Appl. No.: 11/005,132

(22) Filed: Dec. 6, 2004

(65) Prior Publication Data

US 2006/0010313 A1    Jan. 12, 2006

(30) Foreign Application Priority Data

Jul. 9, 2004    (TW)    ................................ 93126987 A

(51) Int. Cl.
*G06F 9/00* (2006.01)
(52) U.S. Cl. ................................ 713/1; 713/2; 713/300
(58) Field of Classification Search ................ 713/1–2, 713/300
See application file for complete search history.

(56) References Cited

U.S. PATENT DOCUMENTS

| | | | |
|---|---|---|---|
| 3,820,030 A * | 6/1974 | Williams | 327/160 |
| 4,137,568 A * | 1/1979 | Dlugos | 708/445 |
| 6,283,789 B1 * | 9/2001 | Tsai | 439/502 |
| 6,532,526 B2 | 3/2003 | Nizar et al. | 711/170 |
| 2001/0040486 A1 * | 11/2001 | Kpodzo et al. | 333/124 |
| 2002/0133695 A1 * | 9/2002 | Khatri et al. | 713/1 |
| 2003/0110368 A1 * | 6/2003 | Kartoz | 713/1 |
| 2004/0024947 A1 * | 2/2004 | Barth et al. | 710/310 |
| 2004/0064686 A1 * | 4/2004 | Miller et al. | 713/1 |

* cited by examiner

*Primary Examiner*—Thomas Lee
*Assistant Examiner*—Brian J Bochicco
(74) *Attorney, Agent, or Firm*—Thomas, Kayden, Horstemeyer & Risley

(57) ABSTRACT

A device for DRAM initialization of a computer system. A detection circuit detects memory condition and outputs a fast initialization signal. A buffer stores initialization parameters of the memory. A memory controller sets the initialization parameters according to memory information, and reads the memory condition to initialize the memory when booting and receiving the fast initialization signal.

22 Claims, 3 Drawing Sheets

METHODS AND DEVICES FOR DRAM INITIALIZATION

BACKGROUND

The present disclosure relates in general to devices and methods for DRAM initialization. In particular, the present disclosure relates to devices and methods for DRAM initialization according to initialization parameters stored when DRAM are not removed.

Computers generally comprise a CPU, chipsets, a memory controller and buses. CPU processes most operations of the computer. Chipsets support the operation of the CPU. Generally, the chipset comprises controllers for transmission of data between the CPU and other devices. The memory controller is a part of the chipset, establishing data transmission between memory and the CPU. Buses are connected between the CPU, memory, and other I/O devices. The bus determines the operating speed of a main board. In response to different data transmission requirements, different kinds of buses are provided. A memory bus is connected between the memory controller and the memory module.

During boot, memory initialization is performed, comprising setting memory operating frequency and a column address strobe latency (CL).

Conventional technology obtains memory initialization parameters by reading serial presence detect (SPD) codes stored in EEPROM of the memory. Thereby, information required for memory initialization is obtained.

Using double data rate-synchronous DRAM (DDR) as an example, the operating frequency of the DDR can be 400 MHz, 333 MHz and 266 MHz, and column address strobe latency (CL) of the DDR can be 3 clocks, 2.5 clocks and 2 clocks. BIOS can initialize the DDR operating at 400 MHz and 2.5 CL according to SPD.

Boot is delayed by determination of the information required for initialization of memory, performed at each boot. However, when memory is not removed between consecutive boots, determination of the information for memory initialization at subsequent boot is unnecessary since determination is the same.

SUMMARY

Methods and devices for DRAM initialization are provided. An embodiment of a method for DRAM initialization of a computer system comprises: storing initialization parameters of at least one memory, detecting conditions of the memory, reading the conditions of the memory to initialize memory during boot, when conditions of the memory have not changed.

Another embodiment of a device for DRAM initialization of a computer system comprises at least one memory, a detection circuit detecting conditions of the memory, and outputting a fast initialization signal, a buffer storing initialization parameters of at least one memory, a memory controller setting the initialization parameters according to memory information, and reading the conditions of the memory to initialize the memory when boot the computer system and receiving the fast initialization signal.

DESCRIPTION OF THE DRAWINGS

The invention will be more fully understood from the detailed description, given hereinbelow, and the accompanying drawings. The drawings and description are provided for purposes of illustration only and, thus, are not intended to limit the invention.

DETAILED DESCRIPTION

Figure 1:
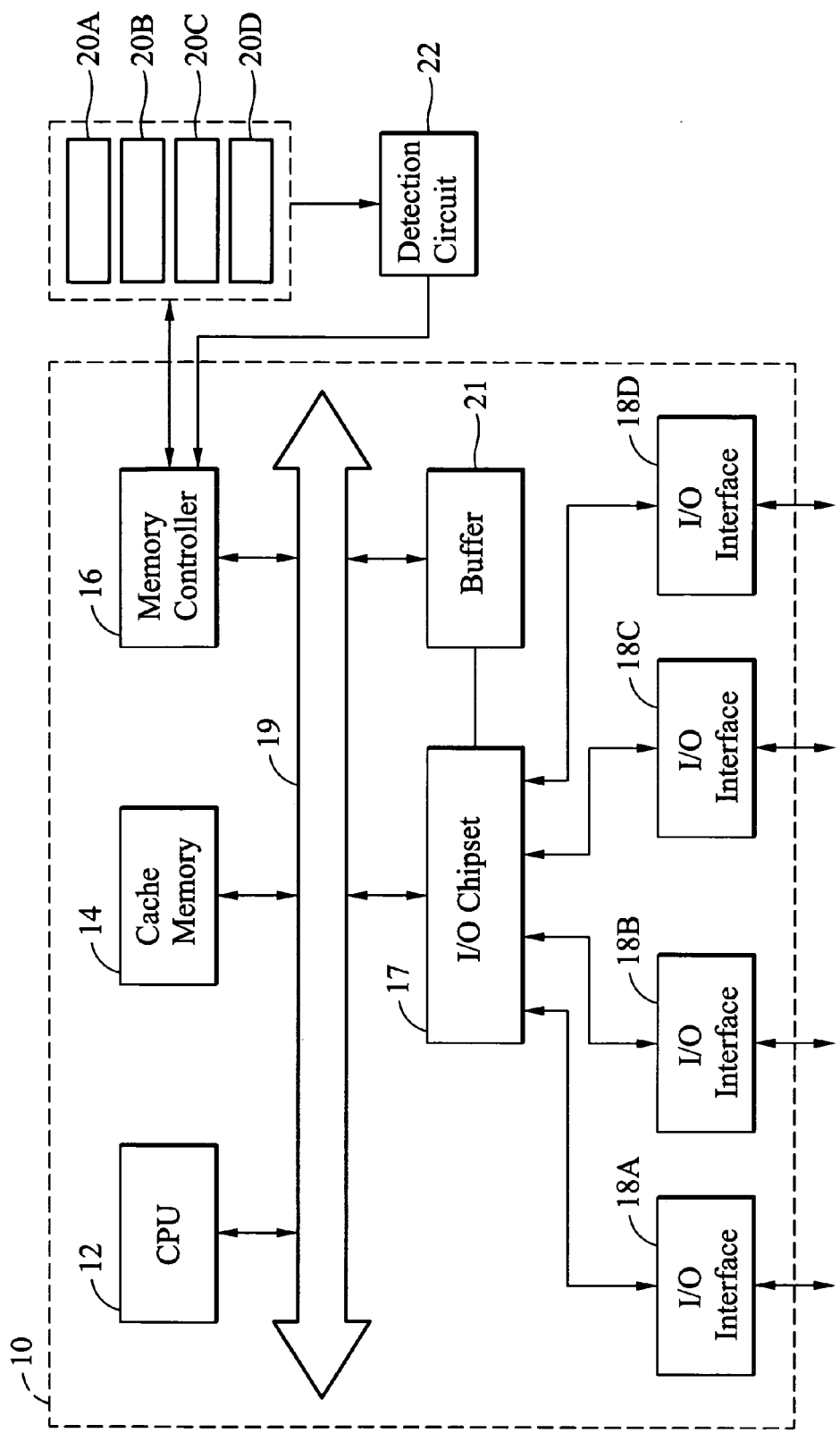
FIG. 1 is a schematic diagram of an embodiment of a computer.

FIG. 1 is a schematic diagram of an embodiment of a computer 10 comprising CPU 12, cache memory 14, memory controller 16, I/O chipset 17 and I/O interface (18A~18D). Computer 10 further comprises buses 19 connected between the devices thereof. Memory 20A~20D may be respectively installed in four dual in-line memory modules (DIMM). In addition, detection circuit 22 detects whether at least one memory 20A~20D is changed. In some embodiments, the detection circuit 22 detects removal of memory from the DIMM. In addition, buffer 21 stores initialization parameters of the memory. In some embodiments, buffer 21 can be located in the Southbridge chipset.

Figures 2A, 2B:
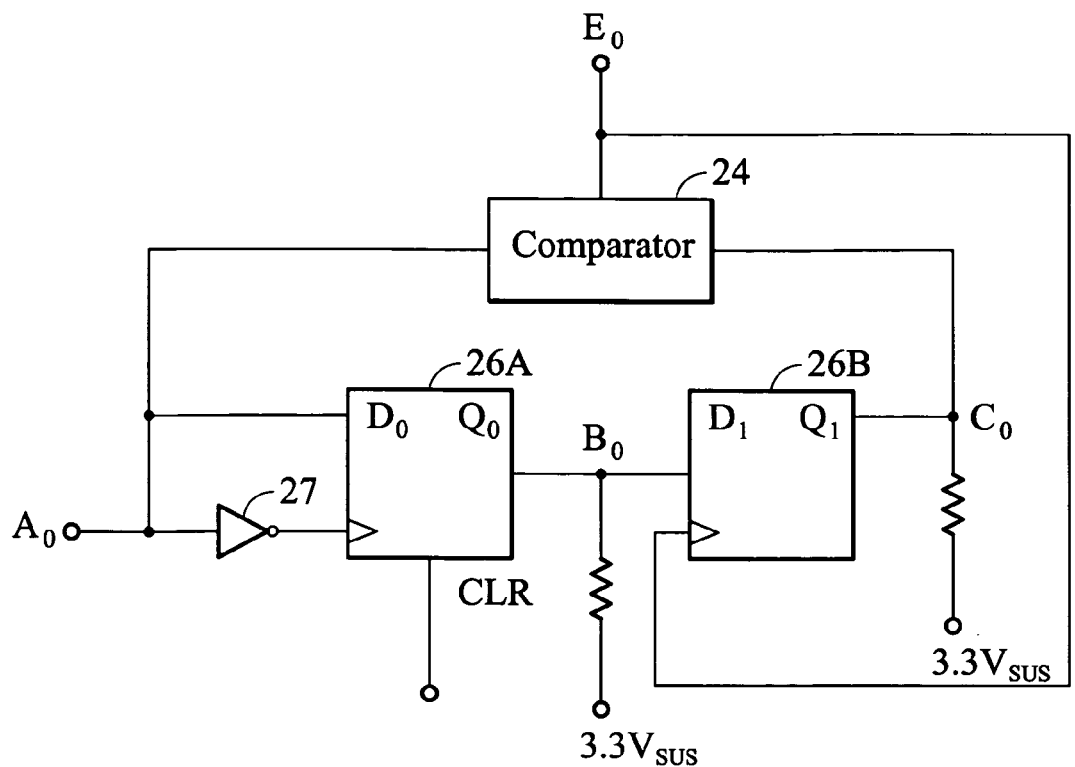
FIG. 2A is a circuit diagram of an embodiment of detection circuit.
FIG. 2B is a true table of the voltage levels against specific terminals of detection circuit shown in FIG. 2A.

FIG. 2A is a circuit diagram of an embodiment of detection circuit 22. FIG. 2B is a true table of the voltage levels against specific terminals of detection circuit 22 shown in FIG. 2A.

Detection circuit 22 comprises comparator 24 and D-type flip-flops 26A and 26B. In some embodiments, comparator 24 can be a XOR logic gate, with terminal $A_0$ representing status of memory 20A. The logic level of terminal $A_0$ is "0" when memory 20A is plugged in the memory module, "1" when memory 20A is removed from the memory module. In addition, as shown in FIG. 1, four terminals $A_0$~$A_3$ respectively represent terminals of memory 20A~20D. FIG. 2A only shows the detection circuit of memory 20A.

In FIG. 2A, the initial values of output terminals $Q_0$ and $Q_1$, respectively, of D-type flip-flops 26A and 26B are "1" because a predetermined voltage $3.3V_{SUS}$ is applied thereto. As memory 20A does not exist, the logic level of terminal $A_0$ and nodes $B_0$ and $C_0$ are high "1", terminal $E_0$ thus outputs low logic level "0".

As memory 20A is installed, the logic level of terminal $A_0$ is at low "0", inverted by inverter 27 and input to D-type flip-flops 26A. Thus, the logic level of terminal $B_0$ is at low "0", and that of terminal $C_0$ is still at high "1". Thus, terminal $E_0$ outputs high logic level "1" because the logic levels of terminals $A_0$ and $C_0$ are different.

In addition, the high logic level "1" of terminal $E_0$ enables D-type flip-flops 26B. Thus, output terminal $Q_1$ is at low logic level "0", and the logic level of terminal $C_0$ becomes low "0". As the logic levels of terminal $A_0$ and node $C_0$ received by comparator 24 are the same, thus the logic level of terminal $E_0$ is at low "0".

As memory 20A is removed, the logic levels of terminal $A_0$ and nodes $B_0$ return to high "1", while that of terminal $C_0$ remains at low "0". Thus, the logic levels of terminal $A_0$ and node $C_0$ received by comparator 24 are different, and the logic level of terminal $E_0$ is at high "1". In some embodiments, the logic level of terminal $E_0$ at high "1" represents output of a fast initialization signal.

In addition, the high logic level "1" of terminal $E_0$ enables D-type flip-flops 26B. Thus, output terminal $Q_1$ is at low logic level "0", and the logic level of terminal $C_0$ becomes high "1". As the logic levels of terminal A0 and node $C_0$ received by comparator 24 are the same, the logic level of terminal $E_0$ is at low "0".

Thus, removal of memory 20A is identified by detecting the logic level of terminal $E_0$ of comparator 24. In addition, removed memories 20B~20D shown in FIG. 1 are also detected by the detection circuit corresponding to each memory.

Figure 3:
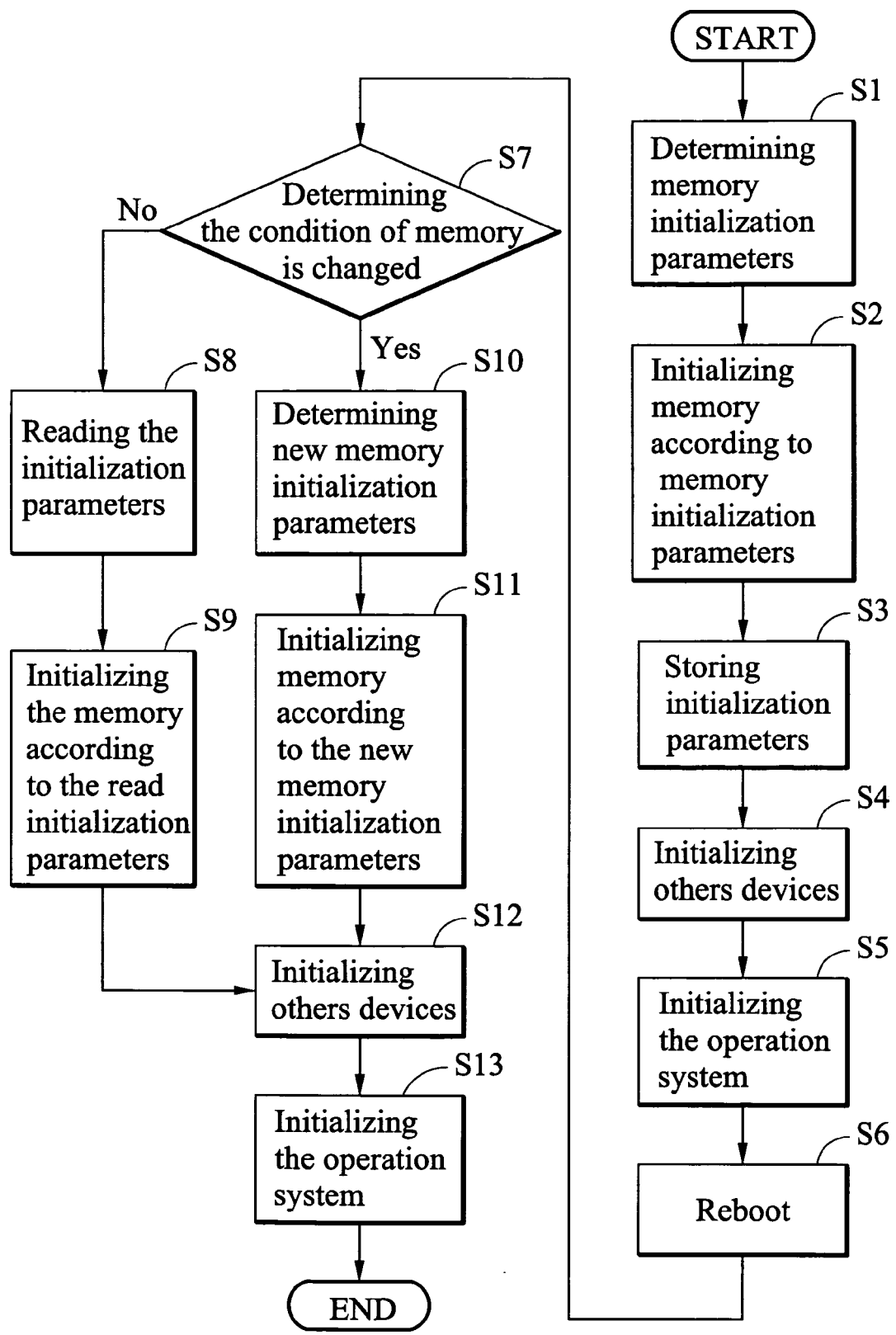
FIG. 3 is a flowchart showing an embodiment of a method for DRAM initialization.

FIG. 3 is a flowchart showing an embodiment of a method for DRAM initialization. The DRAMs can be DDR, SDRAM, EDO DRAM, RDRAM or combination thereof. Note that the elements in FIG. 3 corresponding to those in FIG. 1 share the same reference numerals.

During boot, memory initialization parameters are obtained by detecting serial presence detect (SPD) codes of each memory (S1). Using DDR as an example, the operating frequency of the DDR can be 400 MHz, 333 MHz and 266 MHz, and column address strobe latency (CL) of the DDR can be 3 clocks, 2.5 clocks and 2 clocks. BIOS can initialize the DDR operating at 400 MHz and 2.5 CL according to SPD. As there are a plurality of memories, BIOS must select the initialization parameters for initialization of all memories.

Memories are initialized according to memory initialization parameters (S2). The initialization of memory comprises at least setting the operating frequency and CL of the memories.

The initialization parameters are stored in a buffer 21 (S3). Initialization of other devices is performed (S4), and the operation system is initialized to complete boot operation (S5), allowing normal operation.

When the computer is shut down, power source ($3.3V_{SUS}$) is still provided to detection circuit 22 and terminals A0~A3 to continue detection of memory condition. Thus, the power supply remains connected, or a battery is provided to sustain the operation of detection circuit 22.

When the computer reboots (S6), memory conditions are detected according to the result of detection circuit 22 (S7). If no memory has been changed, the initialization parameters stored in buffer 21 are read (S8), and memory is initialized accordingly (S9). If any memory has been changed, the initialization parameters of the new memory are obtained by detection of SPD code (S10). Next, memory is initialized according to memory initialization parameters (S11). Initialization of other devices is performed (S12), and the operation system is initialized to complete boot operation (S13). In some embodiments, unchanged memory conditions may indicate no memory removal.

Accordingly, memory initialization read from buffer is faster than that determined from SPD codes, especially when all memories are not changed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for DRAM initialization of a computer system, comprising:
storing initialization parameters of at least one memory;
detecting condition of the memory by checking an output signal of a detection circuit, wherein the detection circuit comprises at least a first electric device and a second electric device, wherein the detection circuit is operated by a way comprising:
having the first electric device receiving an input signal from the memory and outputting a first signal in responding to the input signal, wherein the input signal represents whether the memory is installed;
having the second electric device receiving the first signal and outputting a second signal;
comparing the second signal and the input signal; and
identifying whether the second signal and the input signal are different in order to provide the output signal standing for the condition of the memory; and
reading the memory condition to initialize memory when booting if, when the memory condition has not changed.

2. The method for DRAM initialization as claimed in claim 1, further comprising setting the initialization parameters according to memory information.

3. The method for DRAM initialization as claimed in claim 2, wherein the memory information is obtained by detecting serial presence detect codes thereof.

4. The method for DRAM initialization as claimed in claim 1, wherein the unchanged memory condition indicates no memory is changed.

5. The method for DRAM initialization as claimed in claim 1, wherein the unchanged memory condition indicates no memory is removal.

6. The method for DRAM initialization as claimed in claim 1, wherein the initialization parameters of the memory is stored in a buffer.

7. The method for DRAM initialization as claimed in claim 1, wherein the initialization parameters of the memory comprise at least operating frequency or column address strobe latency of the memory.

8. The method for DRAM initialization as claimed in claim 1, wherein the initialization of the memory comprises setting at least operating frequency or column address strobe latency of the memory.

9. The method for DRAM initialization as claimed in claim 1, wherein more than one memory is applied.

10. The method for DRAM initialization as claimed in claim 9, wherein the unchanged memory condition indicates no memory is removal.

11. A device for DRAM initialization of a computer system, comprising:
at least one memory;
a detection circuit detecting condition of the memory, and outputting a fast initialization signal, wherein the detection circuit comprises:
a first electric device receiving an input signal representing whether the memory is installed, and outputting a first signal in responding to the input signal;
a second electric device receiving the first signal, and outputting a second signal in responding to an output signal; and
a third electric device coupled between the first electric device and the second electric device and also outputting the output signal in responding to the input signal and the second signal, wherein the output signal is regarded as the fast initialization signal when the condition of the memory is not changed;
a buffer storing initialization parameters of at least one memory; and
a memory controller setting the initialization parameters according to memory information, and reading the memory condition to initialize the memory when booting and receiving the fast initialization signal.

12. The device for DRAM initialization as claimed in claim 11, wherein the memory information is obtained by detecting serial presence detect codes of the memory.

13. The device for DRAM initialization as claimed in claim 11, wherein the unchanged memory condition indicates no memory is changed.

14. The device for DRAM initialization as claimed in claim 11, wherein the unchanged memory condition indicates no memory is removal.

15. The device for DRAM initialization as claimed in claim 11, wherein the buffer is located in a Southbridge chipset.

16. The device for DRAM initialization as claimed in claim 11, wherein the initialization parameters of the memory comprise at least operating frequency or column address strobe latency of the memory.

17. The device for DRAM initialization as claimed in claim 11, wherein the initialization of the memory comprises setting at least operating frequency or column address strobe latency of the memory.

18. The device for DRAM initialization as claimed in claim 11, wherein more than one memory is applied.

19. The device for DRAM initialization as claimed in claim 18, wherein the unchanged memory condition indicates no memory is removal.

20. The device for DRAM initialization as claimed in claim 11, wherein the first electric device is a first flip-flop, and the first flip-flop comprises a first clock terminal receiving the input signal inverted by an inverter.

21. The device for DRAM initialization as claimed in claim 11, wherein the second electric device is a second flip-flop, and the second flip-flop comprises a second clock terminal receiving the output signal.

22. The device for DRAM initialization as claimed in claim 11, wherein the third electric device is a comparator, and the comparator is an XOR logic gate.

* * * * *